United States Patent
Merrill et al.

(10) Patent No.: US 6,641,907 B1
(45) Date of Patent: *Nov. 4, 2003

(54) HIGH TEMPERATURE EROSION RESISTANT COATING AND MATERIAL CONTAINING COMPACTED HOLLOW GEOMETRIC SHAPES

(75) Inventors: Gary Brian Merrill, Monroeville, PA (US); Jay Alan Morrison, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,237

(22) Filed: Dec. 20, 1999

(51) Int. Cl.⁷ .............................. B32B 3/00; B32B 3/26; B32B 7/12; B32B 18/00
(52) U.S. Cl. ............................. 428/313.9; 428/314.8; 428/317.7; 428/325
(58) Field of Search .................. 428/313.9, 317.7, 428/314.8, 325, 304.4

(56) References Cited

U.S. PATENT DOCUMENTS

| | | | | |
|---|---|---|---|---|
| 4,092,194 A | * | 5/1978 | Green ........................ 156/89 |
| 4,356,037 A | * | 10/1982 | Novak ........................ 106/209 |
| 4,423,097 A | * | 12/1983 | Mons et al. ................ 427/423 |
| 4,450,184 A | * | 5/1984 | Longo et al. ................ 427/34 |
| 4,564,555 A | * | 1/1986 | Hornberger ............. 428/312.8 |
| 4,639,388 A | | 1/1987 | Ainsworth et al. |
| 4,775,598 A | | 10/1988 | Jaeckel |
| 4,867,639 A | | 9/1989 | Strangman |
| 4,916,022 A | | 4/1990 | Solfest et al. |
| 4,975,314 A | * | 12/1990 | Yano et al. ................. 428/213 |
| 5,064,727 A | | 11/1991 | Naik et al. |
| 5,080,977 A | * | 1/1992 | Zaplatynsky ................ 428/432 |
| 5,180,285 A | | 1/1993 | Lau |
| 5,534,308 A | * | 7/1996 | Bamberg et al. ............ 427/454 |
| 5,587,228 A | * | 12/1996 | Baker et al. ............... 428/34.5 |
| 5,683,825 A | * | 11/1997 | Bruce et al. ................ 428/698 |
| 5,780,146 A | * | 7/1998 | Mason et al. ............... 428/328 |
| 5,820,976 A | * | 10/1998 | Kamo ...................... 428/312.8 |
| 5,874,175 A | * | 2/1999 | Li ............................... 428/457 |
| 5,962,076 A | * | 10/1999 | Mason et al. ............. 427/376.2 |
| 6,013,592 A | * | 1/2000 | Merrill et al. ................. 501/80 |
| 6,117,560 A | * | 9/2000 | Schaeffer ..................... 428/325 |
| 6,162,530 A | * | 12/2000 | Xiao et al. ............... 428/292.1 |
| 6,177,186 B1 | * | 1/2001 | Skoog et al. ................ 428/325 |
| 6,177,200 B1 | * | 1/2001 | Maloney ..................... 428/472 |
| 6,190,471 B1 | * | 2/2001 | Darolia et al. .............. 148/537 |
| 6,194,083 B1 | * | 2/2001 | Yasuda et al. .............. 428/615 |
| 6,197,424 B1 | * | 3/2001 | Morrison et al. ........... 428/402 |
| 6,203,927 B1 | * | 3/2001 | Subramanian et al. ...... 428/623 |
| 6,221,512 B1 | * | 4/2001 | Rickerby .................... 428/623 |

FOREIGN PATENT DOCUMENTS

GB    1525037    9/1978

* cited by examiner

Primary Examiner—Tom Dunn
Assistant Examiner—Zidia Pittman (57) ABSTRACT

A material system (60) contains close packed hollow shapes (50, 70) having a dense wall structure (52, 66), which are bonded together and which may contain a matrix binder material (56) between the shapes, where the system has a stable porosity, and is abradable and thermally stable at temperatures up to possibly 1700° C., where such systems are useful in turbine apparatus.

15 Claims, 6 Drawing Sheets

HIGH TEMPERATURE EROSION RESISTANT COATING AND MATERIAL CONTAINING COMPACTED HOLLOW GEOMETRIC SHAPES

BACKGROUND OF THE INVENTION

1. Field of the Invention

The present invention relates to high temperature, erosion resistant coatings, and more particularly relates to the use of such coatings as abradable seals and thermal barrier coatings.

2. Background Information

Most components of combustion turbines are operated at very high temperatures and often require the use of specialized coatings/inserts to protect underlying supporting materials. These specialized coating/inserts include thermal barrier coatings (TBCs), disposed opposite the turbine blade tips, as taught in U.S. Pat. No. 5,180,285 (Lau).

Conventional TBCs typically comprise a thin layer of zirconia. In many applications, the coatings must be erosion resistant and must also be abradable. For example, turbine ring seal segments, which fit with tight tolerances against the tips of turbine blades, must withstand erosion and must also preferentially wear or abrade in order to reduce damage to the turbine blades, and form a tight seal with the turbine blade. Protective coating systems can include several layers including a metallic bond or barrier coating of MCrAlY having an alumina scale and, for example, a columnar yttria stabilized zirconia thermal barrier, as taught in U.S. Pat. No. 4,916,022 (Solfest et al.), which can be further coated by an erosion resistant layer of alumina or silicon carbide, as taught by U.S. Pat. No. 5,683,825 (Bruce et al.).

In U.S. Pat. No. 5,780,146 (Mason et al.), 30 wt. % to 50 wt. % (50 vol. % to 60 vol. %) of hollow alumino silicate or alumina spheres of 400 micrometer to 1800 micrometer diameter, and having a high temperature capability of approximately 1300° C., were used in an aluminum phosphate matrix, for an abradable seal. The seal is used over a ceramic matrix composite shroud segment, which may comprise silicon carbide fibers in an alumina matrix. However, this invention is limited in thermal stability due to uncontrolled sphere distribution and contact, therefore, the matrix controls the thermal stability of system and limits the temperature of the system to less than 1200° C.

Fillers have also been used by Naik et al., in U.S. Pat. No. 5,064,727. There, abradable stationary seal walls, for jet turbine housings which seal opposing, rotating rotor blade tips, have a ceramic core containing from 30 vol. % to 98 vol. % solid ceramic filler, where the ceramic fills a honeycomb wall structure. This is then covered with erosion and corrosion resistant outer layer, which is made porous by uniformly dispersed, finely divided filler. The pores can be filled with ceramic, metal oxide or carbide materials. Fillers mentioned include hollow $ZrO_2.8YO_3$ ceramic spheres and solid $Al_2O_3$, SiC, TiC and BN spheres.

Other abradable honeycomb structures for use in turbines are taught in U.S. Pat. No. 4,867,639 (Strangman). There, low melting fluorides, such as $BaF_2$, are incorporated into a stabilized zirconia or alumina matrix which, in turn, is used to fill a honeycomb shroud lining made of, for example, a metal alloy. The filling becomes molten when the rotating blade tips rub the shroud, and upon resolidification, improve the smoothness of the abraded surface. Ainsworth et al., in U.S. Pat. No. 4,639,388, teaches another variation of reinforced ceramic layers, including a honeycomb matrix for use in a turbine as abradable seals.

In U.S. patent application Ser. No. 09/261,721, Merrill et al., filed on Mar. 3, 1999), a honeycomb structure having open cells was filled, and optionally overlaid, with a material containing hollow ceramic particles embedded in an interconnected ceramic matrix, to provide a composite thermal barrier composite coating having superior erosion resistance and abrasion properties for use on combustion turbine components. The hollow particles were preferably spherical and made of zirconia, alumina, mullite, ceria, YAG or the like, having an average particle size of about 200 micrometers (0.2 mm) to 1500 micrometers (1.5 mm). The steady state erosion rate, grams lost/kg erosive impacting media, of this filler was 3.2 g/kg vs. 4.6 to 8.6 g/kg for conventional TBCs. Here, the ceramic matrix comprised an interconnected open cell honeycomb structure, binding the hollow spheres together where the hollow spheres were bonded by a network of aluminum phosphate bridging bonds.

In U.S. patent application Ser. No. 09/536,742, filed on Mar. 28, 2000, a vacuum packing/impregnation method of bonding hollow geometric shapes was described, to provide abradable, thermally stable seals and the like. Both U.S. patent application Ser. No. 09/049,369, Morrison et al., filed on Mar. 27, 1998, now U.S. Pat. No. 6,197,424) and Ser. No. 09/049,328, Merrill, filed on Mar. 27, 1998, now U.S. Pat. No. 6,013,592), teach ceramic insulating coatings with improved erosion resistance and macroscopic closed porosity, utilizing hollow oxide-based spheres which can contact at least 3 or 4 other hollow spheres to provide improved dimensional stability at temperatures up to about 1600° C. Erosion rate, grams lost/kg erosive impacting media was 4.5 g/kg and 7.5 g/kg.

However, none of these coatings or seal structures have optimized abradability with erosion resistance and insulating capability, minimized shrinkability and thermal mismatch, provided constrained stabilized uniform spherical porosity and adequate flexibility, and optimized thermal stability for operation substantially up to 1600° C.; all of which characteristics will be required of the next generation high temperature turbine TBCs, seals and the like, as well as in non-turbine coating applications. What is needed are high temperature coatings, and composites that fill these and other future requirements.

Also, thermally sprayed structures having hollow spheres co-sprayed to introduce porosity for either abradability or reduced thermal conductivity, are limited to small sphere sizes, typically less than 200 microns, for spraying capability. These small spheres tend to melt in plasma and result in non-spherical pores which are not thermally stable. Such small scale porosity leads to poor erosion resistance. Additionally, thermally sprayed coatings/structures for abradable seals based on co-spray of fugitive particles, for example, polyester resin particles, which are subsequently burned out to leave increased porosity, results in small, non-spherical porosity and matrix-dominated properties which limit thermal stability. The present invention has been developed in view of the foregoing, and to address other deficiencies of the prior art.

Therefore, it is one of the main objects of this invention to provide a high temperature, erosion resistant coating and material which is bondable, generally non-shrinking, abradable, flexible, thermally stable up to at least 1600° C., and which has constrained stabilized porosity and insulating properties, as well as controlled thermal conductivity and thermal expansion properties.

SUMMARY OF THE INVENTION

These and other objects of the invention are accomplished by providing a material system, useful as an erosion resistant high temperature layer, comprising a substantially close packed array of generally contacting, hollow, individually formed geometric shapes, having a coordination number greater than or equal to 1 and having a 70% to 100% dense wall structure, which are bonded together, and which material system has a constrained stabilized porosity and is abradable, thermally insulating, thermally stable and substantially non-shrinking at temperatures up to at least 1600° C. Wall thickness greater than about 100 micrometers is preferred, in order to provide good erosion resistance. This material provides an optimized combination of physical and thermal properties needed in the industry but heretofore not attainable, but which will be essential in the future.

Preferably, the geometric shapes are selected from rigid, hollow, essentially closed ceramic spheres and other similar geometric shapes of low aspect ratio, less than 10 and preferably less than 5, such as hollow cylinders and the like. The shapes are "individually formed," defined here as meaning formed separately and then; stabilized during manufacture, rather than being formed in situ on a substrate etc. The hollow ceramic shapes have "dense" walls, defined here As having a density from 70% to 100% of theoretical (0% to 30% porous). Because the geometric shapes are independently formed, denser wall formation results, which allows crack deflection and general toughening of the material, as well as allowing geometric stability to very high temperatures approaching 1700° C. Hollow spaces between, for example, one diameter of a first large geometric shapes can be filled with second, smaller diameter geometric shapes, to reduce void volume and minimize, consistent with some measure of flexibility, the content of matrix ceramic bonds which help bond the shapes together.

Preferably, there are three dimensional "chains" of hollow shapes, where a substantial number of shapes contact at least 4 to 12 preferably 6 to 10 other shapes. This chain or string-like geometry provides strength and minimizes large void volumes being close to each other. The material system should have some measure of porousness, at least 15 vol. % usually up to a maximum 90 vol. %, preferably 40% vol. to 70% vol. for turbine thermal insulating and abradable coatings, and preferably has some randomness of the contacting shapes in its structure. The material system of this invention due to its structure, is also highly friable, while maintaining a low elastic modulus.

BRIEF DESCRIPTION OF THE DRAWINGS

The invention is further illustrated by the following non-limiting drawings, in which.

DETAILED DESCRIPTION OF THE PREFERRED EMBODIMENTS

Figure 1:
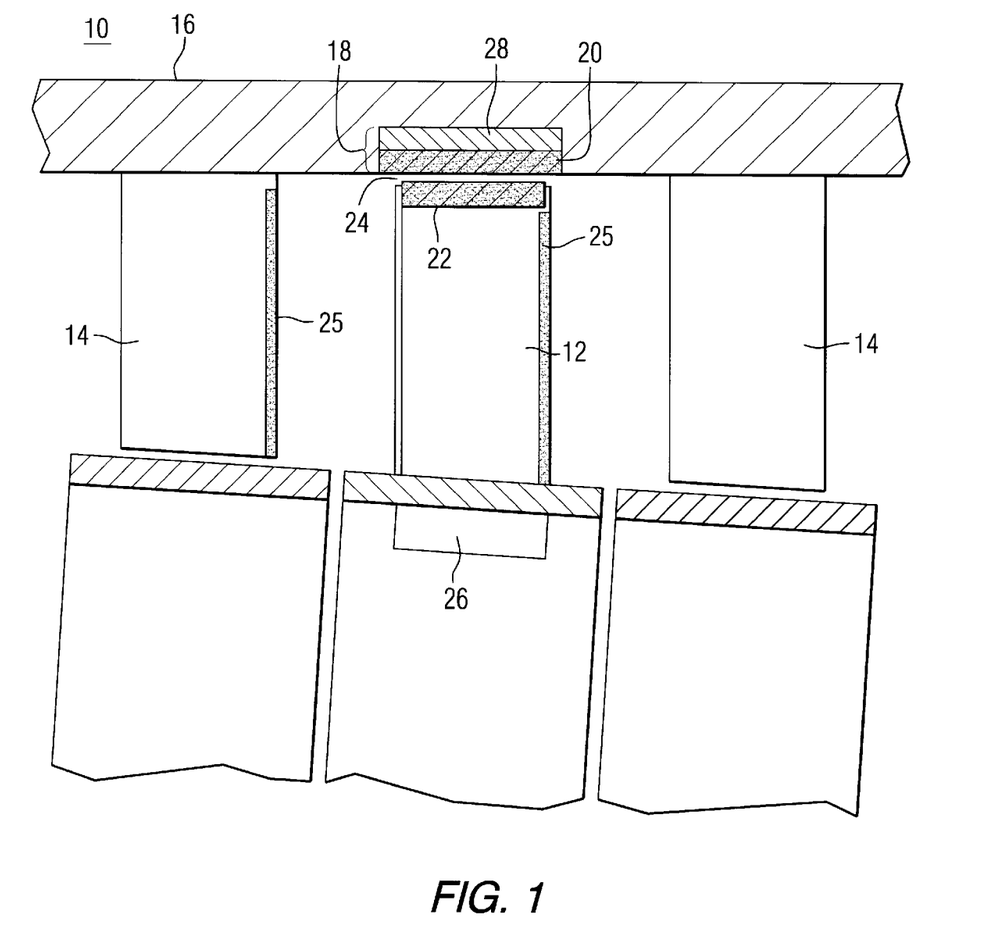
FIG. 1 is a cross-section through a gas turbine shroud and other turbine components in a turbine assembly, showing an abradable seal and a turbine tip, with associated turbine blades and vanes.

Referring now to FIG. 1, a combination of rotatable turbine blades 12 and stationary turbine vanes 14 are shown in a turbine assembly apparatus 10 having a turbine casing 16. Turbine shrouds 18 are arranged circumferentially around one of the stages of the turbine blades and have abradable shroud seal layers 20 which cooperate with the turbine blade tip 22 to form a seal 24, shown unproportionally wide for the sake of clarity. Blade attachment root 26 is also shown as well as support plate substrate 28 for the seals 20 and potential thermal barrier layer 25 on the turbine blade 12. The vanes 14 are stationary and confine and guide hot gases flowing through the associated gas turbine. Thermal barrier layer 25 could also be used on the vane surfaces. The layer 25 is only shown on the edge, but can and usually would cover the entire surface of the blade 12 and the vane 14. In order to improve performance (thermodynamic efficiency and power output), thermal barrier layers have been applied to cooled turbine components to reduce the amount of cooling air, etc. required. Recently, to improve sealing effectiveness, the seal leakage area 24 has been reduced by having the blade tip insert 22 contact and abrade the shroud seal 22, to provide individual, tight seals between each seal and its corresponding turbine blade. In this invention the shroud seal, and most other seal or wear areas in the turbine apparatus can be made of the, erosion resistant, highly filled, high temperature material of this invention, utilizing from about 20 vol. % to 85 vol. % of individually formed, close packed, hollow geometric shapes having walls over 70% dense. This same coating is also useful as a thermal barrier coating for blades, vanes, combustors and other like objects in a gas turbine engine which currently require active cooling.

Figure 2:
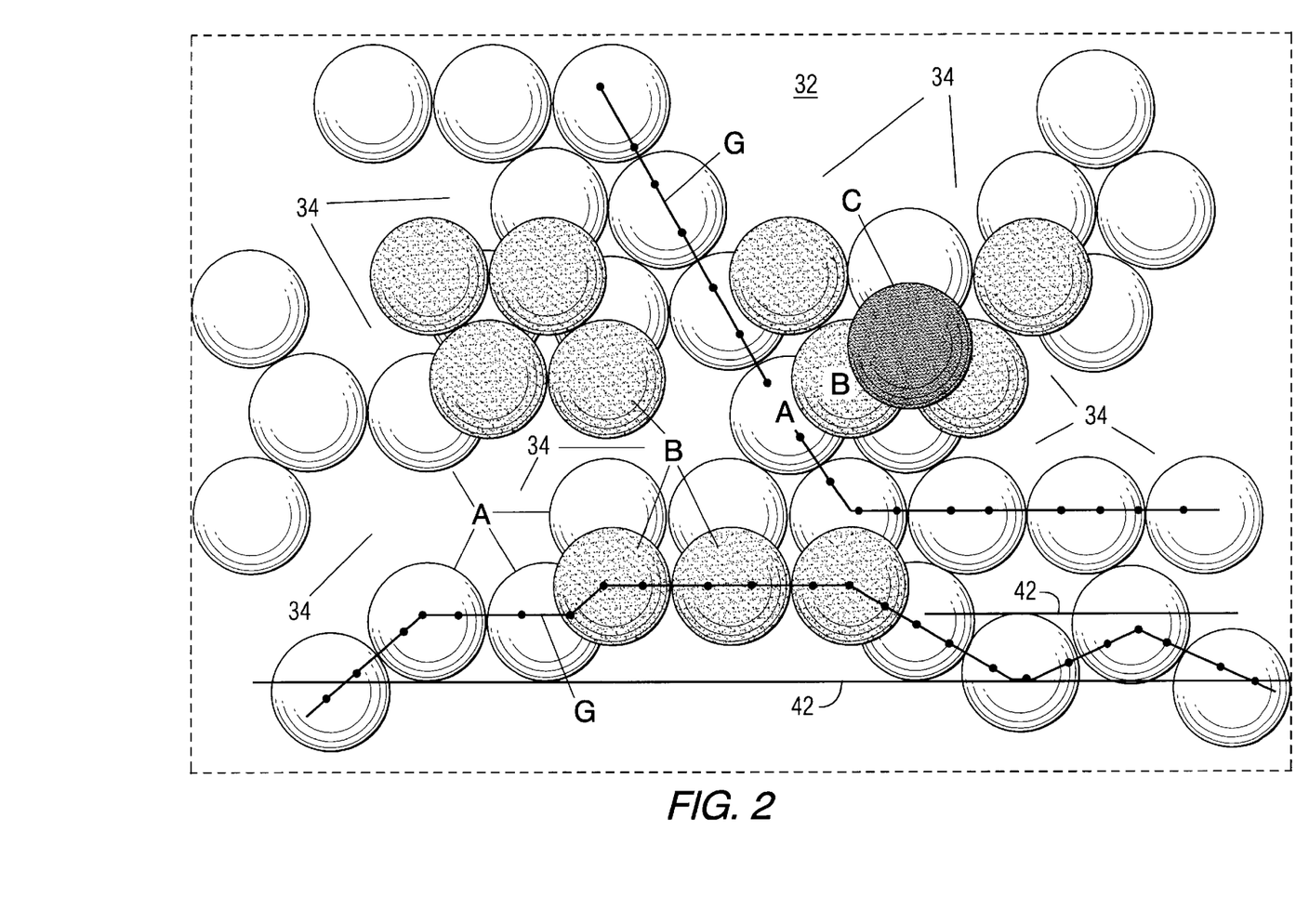
FIG. 2 is a generalized drawing of what one embodiment of the filled, abradable structure of this invention, containing about 30% vol. to 60 vol. % of generally contacting spheres, having coordination numbers of about 3 or 4 to 6, might ideally look like on a microscopic level.
Figure 3:
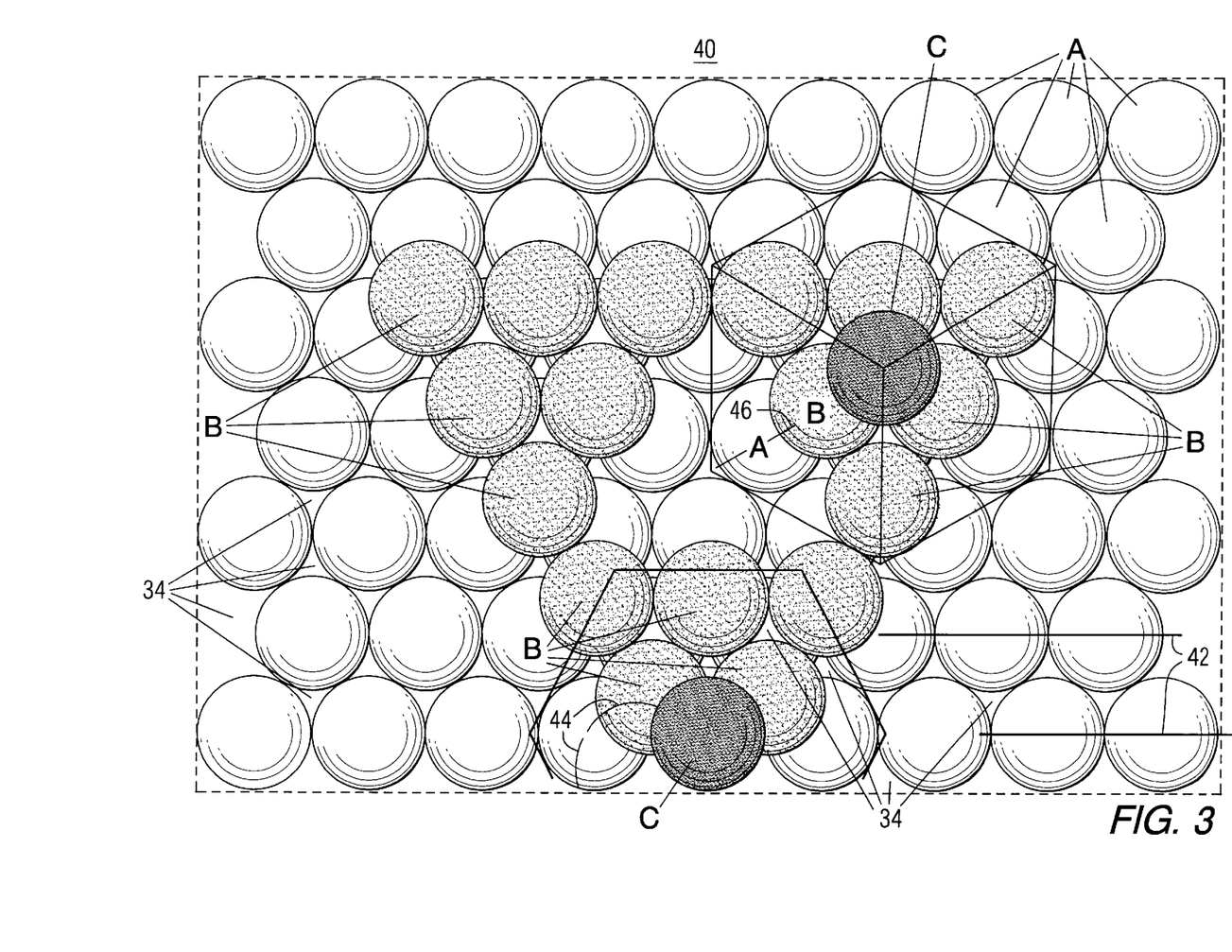
FIG. 3 is a generalized drawing of what the filled, abradable structure of this invention, containing about 50% vol. to 90 vol. % of generally contacting, substantially close packed spheres, having coordination numbers of about 5 to 12, might ideally look like on a microscopic level.
Figure 4:
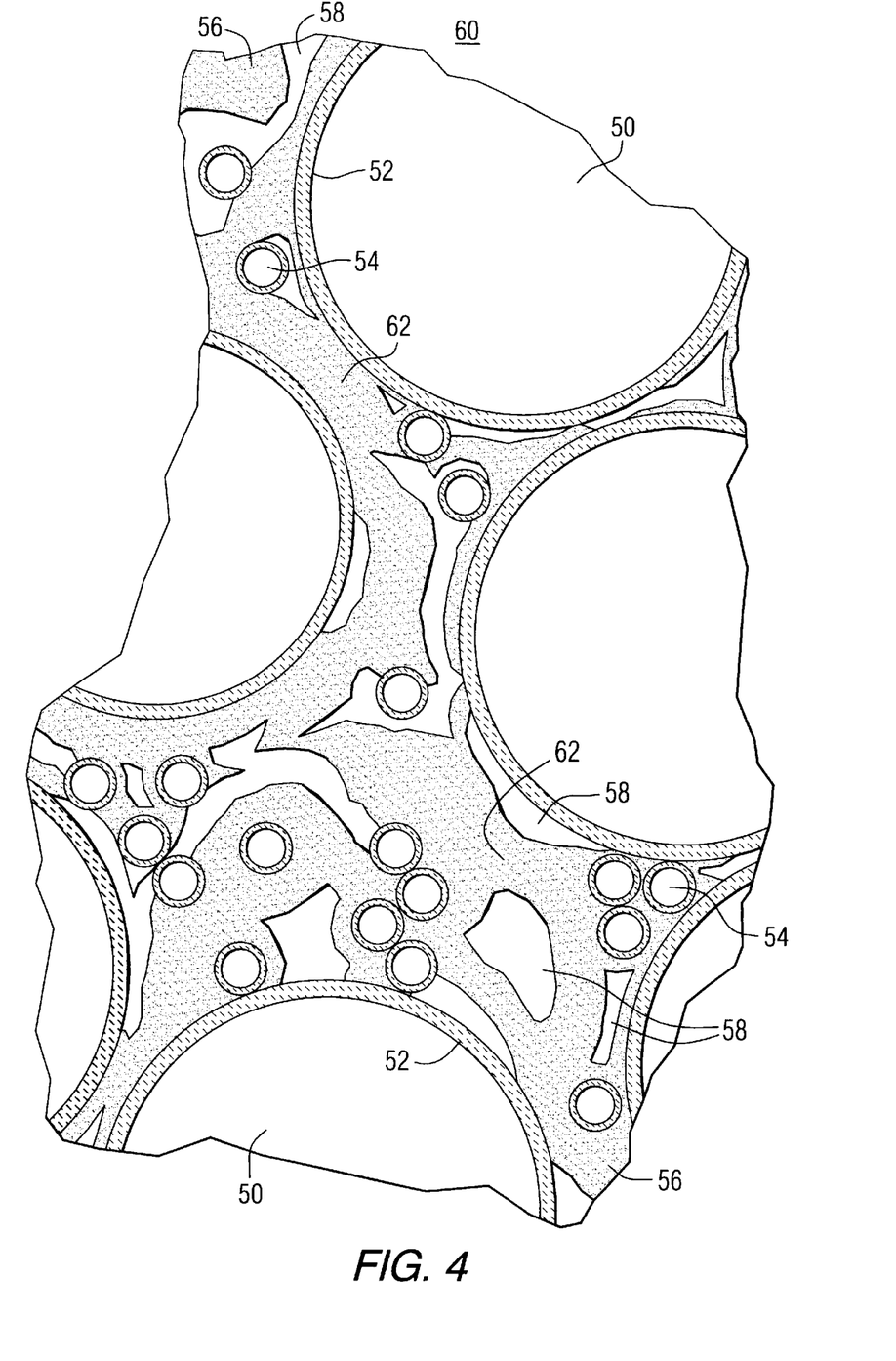
FIG. 4, which best shows the invention, is an idealized, enlarged view of one part of one layer of the generally contacting close packed structure of FIG. 3, but with lower coordination numbers of from about 6 to 10, and containing hollow spheres.

In FIGS. 2 and 3 the spheres used in this invention are shown as three dimensional chain like bodies, but it is understood that they are hollow shapes, more clearly shown in FIG. 4. Referring to FIG. 2, one example of a material of this invention is shown as 32, in idealized form, as a segment within the dotted lines. First layer with spheres A is somewhat discontinuous, although most spheres contact at least two other spheres, with a substantial number, that is about 70% contacting three or four other spheres, which is apparent in locations where the second layer spheres B are shown. Second layer spheres, B are also discontinuous, but with substantial contact with first layer spheres. Only one-third layer, black sphere C is shown, for the sake of clarity. The matrix spaces 34 provide moderate porosity in addition to the closed porosity inherent within the hollow geometric shapes. This interstitial porosity is of secondary importance to the overall wear and thermal properties of the structure, but can be critical to the mechanical behavior—especially at the higher porosity range. The erosion performance is achieved through the use of dense-walled geometric shapes which are resistant to small particle erosion. Abradability is likewise achieved through the introduction of coarse (greater than 100 microns), closed porosity. The simultaneous optimization of both erosion resistance and abradability is achieved through judicious selection of the values and scale of closed porosity, hollow sphere size and wall thickness. The contribution of the matrix 34 is primarily in the mechanical integrity of the structure (strength and elastic constants).

Another example of the material of this invention, shown ideally in FIG. 3, is a close packed array 40, within the segment enclosed by the dotted lines, having generally contacting, mostly continuous, first layer A, mostly continuous second layer B, shown here for sake of simplicity as three clusters, and a mostly continuous top layer, here shown as only two black spheres C, again for clarity. This embodiment has almost universal chain formation in three dimensions among the spheres, providing a high level of constrained stabilized uniform spherical porosity. That is, the chains prevent collapse and substantial shrinking of the system at temperatures approaching 1700° C. Even though most of the layer B and top layer C spheres are not shown in FIG. 3, it is easy to see how this invention's 50 vol. % to 90 vol. % hollow shape, here hollow sphere configuration, allows minimizing the binder matrix spaces 34. Although the material of this invention is capable of very high temperature use, there are many other useful applications at lower temperatures, in the range of 1200° C. to 1500° C., so that the main range of applications is from about 1200° C. to 1600° C.

By "substantially close packed" is mean the type array shown in FIGS. 2, 3 and 4, where the coordination number, defined previously, is greater than or equal to 1. However, some randomness is desired, for maximum fracture toughness, strength and flexibility. FIG. 3 shows two sets of sites for the spheres C of the third layer. A staggered layering as shown by line 44 among spheres A, B, and C, provides a hexagonal close packed array partly shown. A straight layering as shown by line 46 among spheres A, B, and C provides a face centered cubic array.

Referring now to FIG. 4, which most clearly illustrates one embodiment of the invention, hollow spheres 50, having a first size and having walls 52, are shown, substantially close packed with, optional smaller, embedded, hollow shapes, such as hollow spheres 54 having a second smaller size, as well as matrix binder material 56 disposed between the larger hollow spheres 50. Voids 58 are also shown. The hollow ceramic spheres 50 are manufactured such that the sphere walls are about 70% to 100% of theoretical density preferably near 90% to 100% of theoretical density (0% to 10% porous). For good erosion resistance, the wall thickness is preferably between about 100 micrometers to 400 micrometers, depending on sphere diameter. The hollow ceramic spheres uniquely control the dimensional stability of the material system 60 and inhibit gross volumetric shrinkage due to sintering of the matrix-regardless of the matrix binder material selected. The hollow spheres are also critical in establishing the unique macro- and microstructure of the material 60 and in controlling its unique behavior, both thermally and mechanically. The level of closed macroscopic porosity within the material system 60 is defined by the overall size of, the hollow ceramic spheres, the wall thickness of the spheres, and their packing arrangement within the structure. The binder that interstitially bonds the hollow ceramic spheres together may also contribute a secondary role to these properties depending on the mechanical and thermal properties and the amounts of binder material used. The structure of the material system 60 imparts unique combinations of high temperature properties including, for gas turbine applications, excellent erosion resistance, insulating properties, and abradability in an optimized combination not achieved by conventional means.

The material system 60, shown in FIG. 4, is manufactured with closed macroscopic porosity via the use of hollow ceramic spheres (or similar geometric shapes) of size ranges between 200 micrometers diameter to 5000 micrometers diameter, which are independently formed and subsequently bonded together to form a macroscopic infrastructure. The bulk density of these spheres 50 themselves is anywhere between 0.10 and 0.90 of theoretical, that is 10% to 90%, taking into account the internal porosity, and depending upon the needs for each high temperature application. The close-packed, contiguous structure defines and controls the thermal and mechanical properties of the system 60 and maintains dimensional stability of the structure. Coordination numbers for the sphere packing can range from 1 to 14, but preferably, the coordination number of substantially all of the hollow shapes is from 5 to 12, and even more ideally from 5 to 8 for gas turbine coating applications. As mentioned previously, some degree of randomness is preferred for maximum fracture toughness and strength. However, idealized packing arrangements and high coordination numbers in the 8 to 14 range, as shown in FIG. 3, may be preferred for stiffness-driven applications such as cores for sandwich structures.

It is critical that the spheres 50 be separately formed and stabilized vs. formed in-situ. The individually formed and bonded spheres impart unique properties to the material system 60. Contact between dense-walled spheres is not overly intimate due to the lack of sintering between spheres at processing and application temperatures—thus allowing crack deflection and some degree of toughening of the material. Forming the spheres separately allows the stabilization of the spheres to a much higher temperature than otherwise possible. In-situ formed voids, inevitable in most coating operations, are generally interconnected, thus increasing the overall size of critical defects and weakening the structure. By using Independently formed hollow spheres, substantially all large voids 50 within the hollow spheres are separated by at least 2× the sphere wall thickness, as shown, for example, at point 62 in FIG. 4. It is also desirable that small voids 58 not be interconnected, but separated, as at point 62.

The ceramic hollow spheres such as 50 in FIG. 4 will typically have a wall thickness-to-radius ratio ("t/r" ratio) of between 0.05 to 0.50. Depending upon the application, this t/r ratio can vary, for example: for lightweight insulation where erosion is not critical (or is accommodated), t/r in the lower end of this range is desirable; for insulating or abradable coatings, that is, in a gas turbine, where erosion is a concern, t/r between 0.1–0.4 is preferable; for very strong or erosion resistant materials, the higher end of the t/r range is desirable.

For many applications, the absolute value of the wall thickness is critical to achieving adequate erosion resistance. Therefore, the t/r and overall diameter of the spheres must be considered. For example, if a 200 micrometer wall thickness is required for erosion resistance, and the overall bulk density of the material system is defined by abradability requirements, that is, about 60%, this helps narrow down the range of sphere sizes possible (other variables include sphere packing density and matrix density). Wall thickness will generally range from about 0.05 mm (50 micrometers) to 0.5 mm (500 micrometers).

The shape of the hollow particles is ideally spherical, for ease of manufacture and for attaining isotropic properties.

However, other similar shapes can be readily made and incorporated in like manner and perhaps introduce certain optimized properties, for example, the shapes can be hollow elongated spheroids, or needlelike shapes either randomly oriented or preferentially oriented parallel or perpendicular to the substrate surface and having aspect ratios less than 5-to-1 and lengths between 200 micrometers and 5000 micrometers. Hollow ellipses or other irregular spheroids can be made and indeed are within the normal range of sphere manufacture. Mixtures of spheres, spheroids, low aspect ratio cylinders and other shapes are also natural extensions of this invention and are conceived herein, in fact, at least one manufacturing process for hollow spheres also produces hollow, long needle structures.

Figure 5:
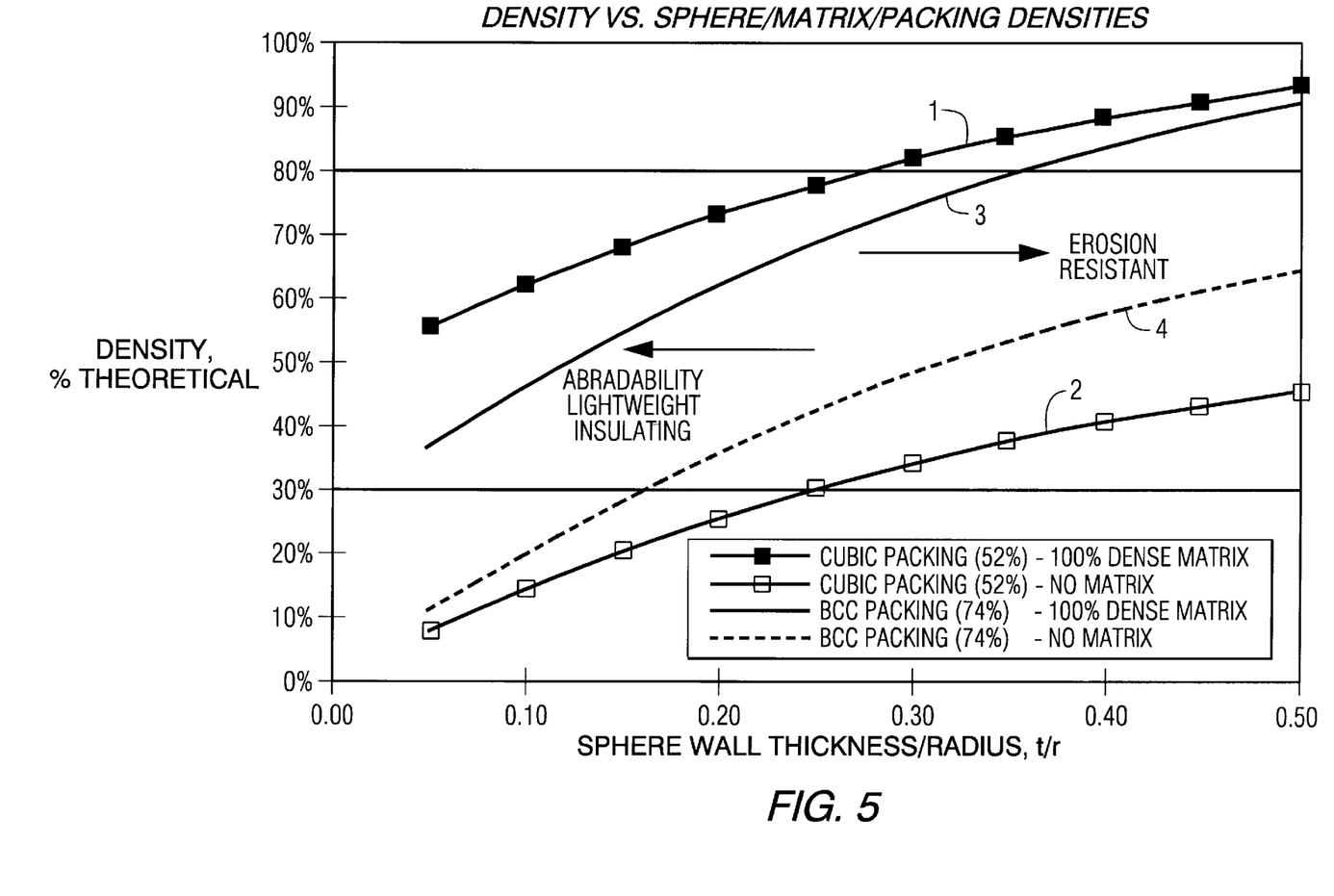
FIG. 5 is a graph of material system density in terms of theoretical density vs. "t/r" (wall thickness/sphere radius) ratio.

Overall bulk density of the entire material system—including the sphere density, their packing arrangement, and the matrix/filler/binder material—is generally in the range of 0.10 to 0.80, that is, 10% to 80% of theoretical density, depending on the application. For the example of turbine engine coatings for either insulation or abradability (or both), the range of overall density of the material system and its makeup can vary over a wide range. By controlling the bulk density, that is, sphere size, sphere wall thickness and binder density) of the material system, the properties can be optimized for erosion resistance and/or abradability, as shown in FIG. 5, which is, a graph of material system density in terms of theoretical density vs. t/r. The best range for abradable coatings is 30% to 80% theoretical density. The best range for erosion resistance is from about a 0.3 to 0.5 t/r within the 30% to 80% range, while the best range for abradable lightweight coatings is from about a 0.1 to 0.3 t/r within the 30% to 80% range, where in all cases "BCC" means body centered cubic packing. Curve 1 is 52% cubic packing and 100% dense matrix; Curve 2 is 52% cubic packing and no matrix; Curve 3 is 74% body centered cubic packing and 100% dense matrix; and Curve 4 is 74% body centered cubic packing and no matrix. The most preferred combination of bulk density plus t/r for both abradability, erosion resistance and insulating characteristics is 30% to 80% bulk density plus a t/r ratio between 0.15 and 0.45.

Note that while FIGS. 2, 3 and 4 show cases of regular packing of uniformly sized spheres, the packing of the spheres is not limited to either form or packing nor is it limited to uniformly sized spheres, nor is it limited to any kind of regularity of structure (random packing is more the norm and is allowable so long as the at least substantially "close-packing" criteria is met). Non-uniform sphere sizing may be desirable to achieve higher sphere packing densities.

Sphere walls must be over 70% dense, but are preferably near theoretical density. (90% to 100% of theoretical density) to maintain thermal stability over the widest range of temperatures. The high density of the sphere walls imparts excellent erosion resistance and controls the thermal and mechanical behavior of the system. The manufacturing temperature of the hollow spheres is well in excess of the intended use temperature of the material system, for example, mullite ($3Al_2O_3 \cdot 2SiO_2$) hollow spheres can be manufactured at 1750° C., rendering them inert and stable in a material system operating indefinitely at 1600° C. to 1700° C. Separately forming and stabilizing the spheres to high temperatures ensures the thermal and dimensional stability of the system at future high temperature operating ranges up to 1700° C. and possibly beyond. The hollow ceramic spheres, rods, etc. are bonded together interstitially by a ceramic matrix material to form a contiguous and self-supporting structure. The matrix material itself and the interconnected network of spheres both form contiguous structures in the claimed material. The volume content of the matrix material can vary from near zero to completely filling in the interstitial space between the hollow shapes. Preferably the matrix constitutes a minimum of 10% of the interstitial space between the hollow shapes for all coordination numbers. The matrix content and density are tailored to achieve the desired properties for the specific application, taking into account: the desired bond strength between hollow shapes, the overall bulk density required for abradability purposes; the individual and packing densities of the hollow shapes; permeability requirements; overall mechanical strength of the system; overall thermal conductivity properties desired; and mass considerations (for example, for flight applications). The matrix may or may not contain filler or reinforcing media, including but not limited to, smaller hollow spheres or other geometric shapes, powders, particles, platelets, and whiskers or chopped fibers or other discontinuous fibrous materials.

In the case of thick-walled shapes, where t/r is greater than 0.25, it may be advantageous to minimize the amount of matrix in the system—so long as the bond strength and other criteria are met. A very strong structure, particularly in compression, can be achieved with very little matrix addition. In the case of thin walled shapes (t/r less than 0.25), particularly at the higher coordination number ranges, it may be advantageous to maximize the amount and density of the continuous matrix phase to increase erosion resistance while maintaining low overall composite density, light weight, and low thermal conductivity."

The composition of the ceramic hollow shapes can be any oxide or non-oxide ceramic material including (but not limited to) those shown in Table 1 below:

TABLE 1

| OXIDES | CARBIDES | NITRIDES |
| --- | --- | --- |
| Alumina, Silica | SiC, WC, NbC | $Si_3N_4$, TiN |
| Mullite, Zirconia | TaC, HfC, ZrC | SiCN |
| Zircon, YAG, Yttria | TiC | |
| Ceria, Hafnia, Beryllia | | |

The ceramic matrix material may be either of an oxide based or a non-oxide based composition, including (but not limited to) the compositions also shown in Table 1 above.

Typically, high temperature, stable ceramic particulate filler materials are used in the binder system for the material system. The purpose of these fillers may be to add density to the matrix (without necessarily adding strength), add strength to the matrix, add toughness to the matrix, either via reinforcing or residual stress management, or improve cost savings. Typically, the particulate material in the slurry-based binder may be of the composition but not limited to those in Table 2 below, and typical binders are listed in Table 3 below.

TABLE 2

| PARTICULATE |
| --- |
| Mullite |
| Alumina |
| Zirconia |
| Hafnia |
| Yttria |
| Yttrium Aluminum |
| Garnet (YAG) |
| Ceria |
| Silicon Carbide or |

TABLE 2-continued

PARTICULATE

Silicon Nitride
Hollow Shapes of the
Above

TABLE 3

BINDER

Aluminosilicate/Aluminumphosphate
Aluminumphosphate/
Aluminumoxycarbide
Aluminumorthophosphate
Aluminumorthophosphate
Aluminumorthophosphate
Aluminumorthophosphate
Aluminumorthophosphate
Polycarbosilane
All Binders Listed Above Any of a number of existing or conceivable methods of making hollow ceramic spheres can be used to create the spheres used in material system. A few commercial sources exist for macroscopic hollow spheres (>200 micrometers)—including Keith Ceramics Ltd (UK) and Ceramic Fillers Inc. (U.S.A.). These sources offer spheres made via traditional sol-gel or slurry processing-routes and are primarily oxide-based materials. However, virtually any process used to form ceramics can be envisioned for creating hollow ceramic spheres, for example, polymer precursor coating of fugitive spheres, plasma spraying or reaction forming. In many processes, a certain amount of hollow needle structures are necessarily produced which with filtering can be used separately as the geometric shape of the erosion resistant coating of this invention.

The spaces in the material system matrix may be filled in many ways, including (but not limited to) ceramic processing methods where the ceramic matrix material or binder consists of slurry or liquid based ceramic binder, or particulate materials may be mixed with a liquid binder to form a slurry, the viscosity of which is controlled to provide suitable characteristics. In the latter instance, the liquid binder can consist of ceramic bonding agent in solution; for example, the liquid binder may be aluminum orthophosphate solution, alumina or mullite or silica sol or aluminum hydroxyl chloride. A typical composition of slurry based ceramic matrix could consist of the following constituents: 1 part by wt. sintered mullite powder (25 micrometers average particle size), and 0.858 part by wt. of 50% aqueous solution aluminum orthophosphate. The ceramic slurry could be premixed with the ceramic hollow spheres. The hollow ceramic spheres would pack down during drying. The contiguously packed ceramic hollow spheres could be fired at temperatures between 600° C. and 1600° C. In the case of the aluminum orthophosphate solution mentioned above, the transformation of aluminum phosphate to alumina will be proportional to the firing temperature. The higher the firing temperature, the greater the volume % of alumina. Alumina provides solid state bonding of the particulate mullite particles in the absence of aluminum phosphate.

As an alternative to slurry based ceramic binder, a liquid based binder may be used. The liquid ceramic binder may typically be an aqueous solution of aluminum phosphate or aluminum hydroxyl chloride or a sol such as mullite, alumina or zirconia based. The liquid binder may typically coat each sphere with a thin coating that, when fired will bond the ceramic hollow spheres at the points of contact or contiguity. Such material may be modified by a secondary slurry based filling step used to increase the overall bulk density and properties of the final material by filling the interstitial spaces available between the contiguously, pre-bonded spheres. As an alternative to slurry based or liquid based ceramic binders, other manufacturing processes may be used, which include but are not limited to polymer precursor impregnation, reaction forming, directed metal oxidation, air plasma spray, chemical vapor impregnation, and physical vapor deposition of ceramic precursor gases.

All of these materials preferably have erosion resistance and a fair degree of porosity. Erosion is a complex phenomenon which is elated to material hardness, fracture resistance, grain size, impacting particle energy, etc. For a given material system, erosion resistance is inversely proportional to the porosity in the material. This is true because typical means to introduce porosity yields fine scale interconnected pores in materials with dramatically reduced microhardness and fracture resistance—thus poor erosion resistance. A unique aspect of the material system of this invention is the control of macroscopic porosity through the use of dense-walled hollow spheres. Closed porosity not only results in superior erosion resistance, but also allows a more optimum combination of abradability and erosion resistance. The dense sphere walls (high local hardness) offer protection from erosion while the macroporosity of the system maintains desirable insulation and abradability characteristics.

High levels of porosity can be achieved with the material system of this invention without sacrificing structural integrity or erosion resistance. High porosity yields low thermal conductivity, that is high insulation effect, which is vital for the thermal protection of metallic turbine engine components—many of which operate at temperatures exceeding their melting point. Thermal protection of coated substrates in gas turbine environments is also crucial to their success, and allows the use of currently available, moderate temperature capability substrates in very high temperature environments while still reducing dramatically the required cooling air. Low thermal conductivity is achieved with high porosity levels in this material system without sacrificing erosion resistance. Abradability is achieved in this material system by incorporating high levels of porosity without sacrificing erosion resistance. Optimized abradable behavior is possible due to the erosion resistance margin offered by this material system structure. These bodies/coatings can be formed having high porosities, yet good chain structure, which were previously unachievable via conventional means due to the corresponding, unacceptable loss of erosion resistance. The key parameters for truly abradable materials are overall level of porosity (for a given composition) and "friability", defined as the ability of abraded particles to be removed from the surface, thus preventing densification of the subsurface. The material, systems described, particularly those such as shown in FIG. 3, provides for both qualities by its relatively high porosity levels and use of ceramic spheres for friability.

Low elastic modulus is achieved by these material systems relative to coatings of similar thermal properties. This is due to the ability to achieve high porosity levels without the detrimental attributes normally associated with highly porous materials. Low modulus is crucial to limiting thermally-induced stress not only in these material systems themselves, but also in any underlying substrate material.

These material systems can be an insulating coating for moderate strength substrates for gas turbine applications. Minimizing stress in the substrate is crucial to achieving successful designs with the required lifetimes. These material systems are uniquely capable of providing good thermal protection without introducing undue stress in the substrate.

The properties of the material systems of this invention can be tailored over a broad range to match the behavior of mating materials—including substrates in coating applications. The thermal expansion behavior of these material systems is predominantly that of the spheres used in the structure, with a secondary effect from the matrix. Spheres form a contiguous network and thus dictate the gross expansion of these material systems. Optimized thermal expansion can be achieved through sphere composition selection or through a mixture of different sphere compositions, for example, the thermal expansion of the mullite based material system is only about 0.6% at 1000° C. In addition, for other applications these material systems also have unique properties of virtually unlimited compositional variations, shape forming capabilities, electrical properties, being lightweight, having high specific strength and stiffness, and large part fabrication potential.

The original and most important application of the material systems of FIG. 2, as previously described, is for insulation of structural ceramic and superalloy materials of gas turbine components. There are, however, many other potential uses of these material systems. A unique aspect of these material systems is the ability to form the material system in close collaboration with other materials to which it may need to be attached. For example, in the application to ceramic substrates for insulation protection, the following processing methods are possible: this material system can be coated on a ceramic or composite substrate through conventional casting processes and co-fired with the substrate, or a partially-densified material system can be deposited or cast onto a substrate which has not been fully densified, where the combined structure can then be processed through the remainder of the composite substrate process, thus integrally joining the two materials. This material system can also be envisioned as a low cost, lightweight, and strong core material for composite sandwich structures where mass-specific properties are desirable. Herein, the material systems could be co-processed with the composite skins, resulting in low cost manufacture and superior structure properties.

Other applications for the material system of this invention may include application as combustor liners (can, annular, and can-annular configurations), transitions, transition ducts, static airfoils and platforms (vanes), seals (both blade tip and interstage), and virtually any static surface exposed to a hot gas path. Aerospace applications include aircraft hot gas (engine exhaust) impinged structures and surfaces; thermal protection systems (TPS) for aerospace vehicles (hypersonic or re-entry protection); stiff, lightweight panels or structures for space systems (satellites, vehicles, stations, etc.), etc. Diesel or other ICE applications include cylinder liners, exhaust ports, header liners, etc.

EXAMPLE

Figure 6:
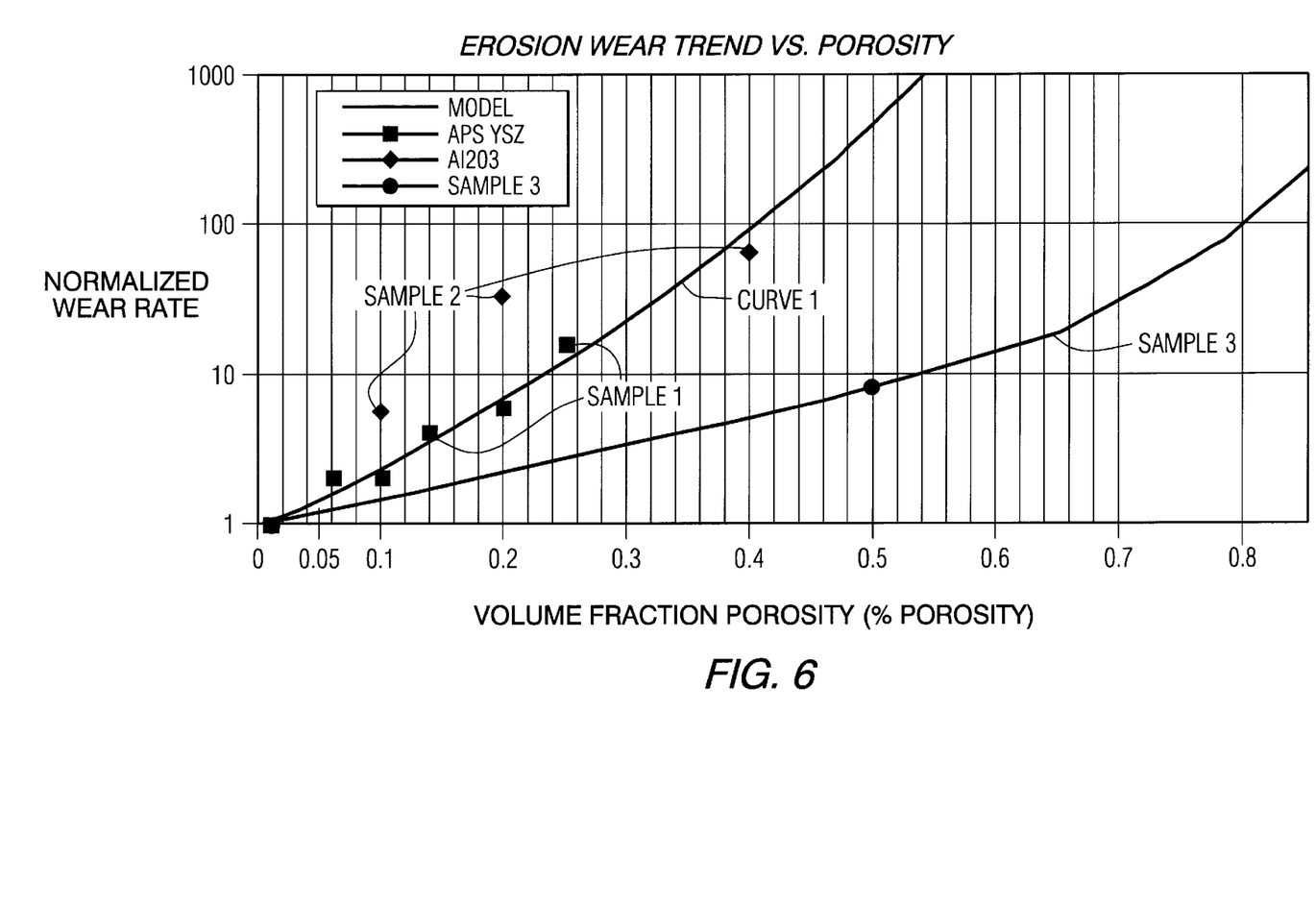
FIG. 6 is a graph comparing erosion wear of the material system of this invention versus prior art compositions.

FIG. 6 illustrates the unique erosion properties offered by the composite coating system described herein. The erosion resistance for a preferred embodiment of the present invention is compared to literature data for similar ceramic material systems. The materials compared are as follows: Curve 1 is a generic erosion model derived for homogeneous ceramic materials with varying degrees of porosity. It is based on a mechanistic model of cracking in ceramics. The parameters used in this model (impacting particle size and velocity and erosion target material properties) are representative of the erosion testing for each sample evaluated. Since the wear rates are normalized for each sample (compared to fully dense versions of the same material), this allows comparison of materials tested under different conditions. Samples 1 and 3 were tested under identical conditions (using 100 micrometer alumina particles at 900 ft/sec velocity, impacting at 15° angle).

Sample 1 was a conventional thermal barrier coating of yttria-stabilized-zirconia composition applied via plasma spraying. Porosity was introduced via control of spraying parameters and through co-deposition of fugitive phases (that is, polyester particles). Sample 2 was a sintered alumina body formed through cold pressing of powders to a predetermined "green" density followed by sintering at high temperatures. Porosity was controlled by varying the green density of the powder compact prior to sintering.

Sample 3 was the preferred embodiment of the present invention and consisted of hollow multi spheres of t/r about 0.3, a particle packing coordination number of 4 to 6, and a matrix of Mullite particle-filled alumina having 50% porosity (fills 50% of the hollow particle interstitial space). The overall bulk density of the resulting composite structure was about 50%. The erosive wear rate of this system as measured by particle impact testing was greater than an order-of-magnitude lower than the theoretical model predicts for a given porosity level. Moreover, the wear rate of the inventive sample at 50% porosity was lower than that of the comparable materials at half that level of porosity. This erosion resistance is achieved due to the composite structure and the combination of hard, thick, dense-walled spheres while maintaining high gross levels of porosity.

The implication of these erosion results is that improved insulating and abradability properties can be achieved in the current invention though controlled introduction of porosity without the normal corresponding increase in erosion rate. This combination of properties is unique and heretofore unachievable by conventional means.

What is claimed is:

1. A material system comprising a substantially close packed array of generally contacting, geometric shapes having a coordination number greater than or equal to 1 and having a 70% to 100% dense wall structure, which are bonded together, and which material system has a constrained stabilized porosity and is abradable, thermally insulating, and thermally stable at temperate up to at least 1600° C., and where the geometric shapes are arranged in a three-dimensional chain structure.

2. The material system of claim 1, where the geometric shapes have a wall thickness greater than about 100 micrometers.

3. The material system of claim 1, where the system is from 15 vol. % to 90 vol. % porous.

4. The material system of claim 1, where the coordination number of the shapes is from 3 to 14, and the system is from 40 vol. % to 70 vol. % porous for turbine insulating and abradable coatings.

5. The material system of claim 1, where the coordination number of substantially all of the shapes is from 5 to 8.

6. The material systemof claim 1, where the shapes are hollow spheres having sizes between 200 micrometers and 500 micrometers diameter.

7. The material system of claim 1, where the shapes are spherical and the wall thickness-to-radius ratio of the hollow spheres are between 0.05 to 0.50.

8. The material system of claim 1, where the shapes are spherical and any large voids within the hollow spheres are separated by at least 2× the sphere wall thickness.

9. The material system of claim 1, where the system is used as an abradable shroud seal layer in a turbine assembly.

10. The material system of claim 1, where the system is used as a thermal barrier for vanes, transitions and combustors in a turbine assembly.

11. The material system of claim 1, where the system is used as a thermal barrier layer on a turbine component in a turbine assembly.

12. A material system comprising a substantially close packed array of generally contacting geometric shapes having a coordination number greater than or equal to 1 and having a 70% to 100% dense wall structure, which are bonded together, and which material system has a constrained stabilized porosity and is abradable, thermally insulating, and thermally stable at temperatures up to at least 1600° C., and where the system is disposed on a substrate.

13. The material system of claim 12, where the shapes are hollow elongated spheroids or other hollow geometric shapes of low aspect ratio, either randomly oriented or preferentially oriented parallel or perpendicular to the substrate surface and having aspect ratios less than 5-to-1 and lengths between 200 micrometers and 5000 micrometers.

14. A material system comprising an array of generally contacting spheres having a coordination number of from 5 to 12, a wall thickness greater than about 100 micrometers, which are bonded together into a three-dimensional structure, where the space between the spheres is at least partly filled with a material comprising a ceramic binder, to provide a system that is from 15 vol. % to 90 vol. % porous and thermally stable at temperatures up to at least 1600° C.

15. The material system of claim 14, wherein the spheres are hollow.

* * * * *